US007752729B2

(12) United States Patent
Faehrrolfes et al.

(10) Patent No.: US 7,752,729 B2
(45) Date of Patent: Jul. 13, 2010

(54) METHOD FOR SHAPING A METALLIC FLAT MATERIAL, METHOD FOR THE MANUFACTURE OF A COMPOSITE MATERIAL AND DEVICES FOR PERFORMING THESE METHODS

(75) Inventors: Herbert Faehrrolfes, Neuburg/Donau (DE); Michael Schiekel, Neuburg/Donau (DE); Klemens Wesolowski, Neuburg/Donau (DE)

(73) Assignee: Metawell GmbH, Neuburg/Donau (DE)

( * ) Notice: Subject to any disclaimer, the term of this patent is extended or adjusted under 35 U.S.C. 154(b) by 1351 days.

(21) Appl. No.: 10/518,892

(22) PCT Filed: Jun. 24, 2003

(86) PCT No.: PCT/EP03/06653

§ 371 (c)(1), (2), (4) Date: Jun. 22, 2005

(87) PCT Pub. No.: WO2004/002646

PCT Pub. Date: Jan. 8, 2004

(65) Prior Publication Data

US 2005/0230033 A1 Oct. 20, 2005

(30) Foreign Application Priority Data

Jun. 27, 2002 (EP) ................................. 02014031

(51) Int. Cl.
*B23P 17/00* (2006.01)
*B21D 13/02* (2006.01)

(52) U.S. Cl. ........................................ 29/424; 156/205

(58) Field of Classification Search .................. 29/424, 29/429, 430, 561, 33 S, 707, 709, 238; 156/205, 156/210; 70/385; 72/385
See application file for complete search history.

(56) References Cited

U.S. PATENT DOCUMENTS

| | | | | |
|---|---|---|---|---|
| 4,461,665 | A * | 7/1984 | Schertler | 156/210 |
| 5,249,445 | A | 10/1993 | Morello | |
| 6,409,857 | B2 | 6/2002 | Pallas et al. | |
| 2002/0134494 | A1 | 9/2002 | Bruck et al. | |

FOREIGN PATENT DOCUMENTS

| | | | |
|---|---|---|---|
| DE | 22 36 807 | A | 2/1974 |
| DE | 31 26 948 | A | 7/1983 |
| EP | 0 939 176 | A | 9/1999 |
| JP | 59 042135 | A | 7/1984 |
| JP | 01 192424 | A | 11/1989 |
| RU | 2 094 152 | | 10/1997 |
| SU | 1335359 | | 9/1987 |

* cited by examiner

*Primary Examiner*—John C Hong
(74) *Attorney, Agent, or Firm*—Buchanan Ingersoll & Rooney PC

(57) ABSTRACT

The invention relates to a method and a device for shaping a metallic flat material to give a metallic wave profile, in which the flat material is passed between two meshing tooth systems of two rotating, toothed rolls. For setting a desired profile height, the centre distance between the rolls can be adjusted, and for presetting of a profile cross-section the flank clearance between the meshing tooth systems can be adjusted. The invention furthermore relates to a method and a plant for the continuous manufacture of a composite material from a metallic wave profile shaped with the aid of the above-described method or the above-described device, and at least one further flat material, which is firmly joined to the wave profile to give the composite material.

41 Claims, 2 Drawing Sheets

Figure 1:
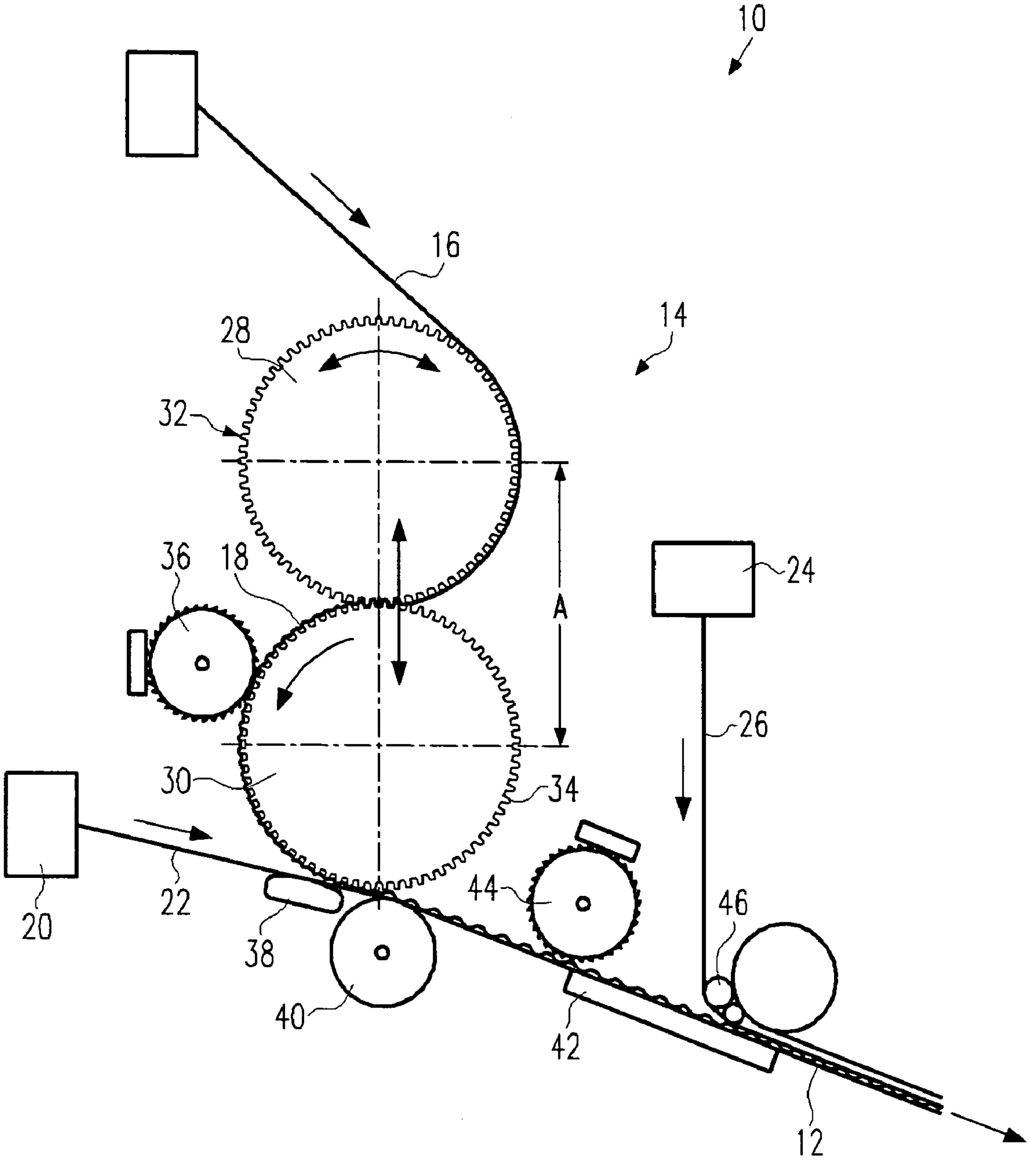

METHOD FOR SHAPING A METALLIC FLAT MATERIAL, METHOD FOR THE MANUFACTURE OF A COMPOSITE MATERIAL AND DEVICES FOR PERFORMING THESE METHODS

The invention relates to a continuous method for shaping a metallic flat material in order to give a metallic wave profile, as well as a device for performing this method.

The invention also relates to a method for the continuous manufacture of a composite material, in which a wavy flat material shaped according to the invention is joined to a further flat material, a composite material manufactured with the method, as well as a plant for performing the manufacture method.

DE 31 26 948 C2 and DE 32 14 821 C2 disclose a method and a device in which in continuous manner a metallic wave profile is shaped from a metallic flat material, the latter being passed between two meshing tooth systems of two rotating, toothed rolls. For the manufacture of a composite material at least one further flat material is applied and fixed to the thus shaped wavy flat material. The composite material manufactured in this way, compared with solid materials and for the same dimensions, has comparable mechanical characteristics, but a much lower weight.

EP 0 939 176 A2 discloses a method and a device in which intermittently and with the aid of a press a cross-sectionally trapezoidal wave profile is shaped on a metallic flat material. Following the shaping of the wave profile on each side of the flat material a further flat material is fixed to the profile elevations of the wave profile for forming a composite material.

However, the methods and devices known from these publications do not permit the shaping of a wavy flat material with varying profile heights and profile cross-sections or the manufacture of a composite material comprising a wavy flat material and at least one further flat material, where said wavy flat material has varying profile heights or profile cross-sections.

DE 22 36 807 A discloses a device for the transverse or cross rolling of profile sheets in which, for setting a desired profile height, shaped segments are radially displaceably placed on rolls. For setting a profile spacing of the profile sheets, the shaped segments can be displaceably circumferentially arranged on the rolls.

Further methods and devices for the wavy shaping of a flat material are known from Patent Abstracts of Japan, vol. 008, no. 146 (M-307), 7.7.1984 (JP 59 042135 A) and vol. 013, no. 484 (M-886), 2.11.1989 (JP 01 192424 A).

The object of the invention is to make available a continuous method and a device for shaping a metallic flat material into a metallic wave profile, as well as a method and a plant for the continuous manufacture of a composite material from a wavy flat material and at least one further flat material, in which at limited cost and with high flexibility it is possible to easily manufacture the most varied profile heights and profile cross-sections in the wave profile of the wavy flat material.

The invention achieves the object by a method and a device for shaping a metallic flat material into a metallic wave profile. The object is also achieved according to the invention by a method for the continuous manufacture of a composite material, a composite material having the features according to the method, as well as by a plant for the continuous manufacture of a composite material.

According to the invention, the shaping of the metallic flat material, which can e.g. be a sheet, a web or a strip made from a hard metal alloy, such as a work-hardened, thoroughly hardened aluminum alloy, a steel suitable for cold shaping or working, is carried out with the aid of meshing tooth systems of the two rotating rolls. Due to the mechanical characteristics of the flat material to be shaped and in particular hard alloys having a relatively low elongation at break and which are correspondingly difficult to shape, the use of meshing rolls for shaping the flat material into a wave profile offers the advantage that the flat material can be shaped comparatively gently and with relatively limited shaping forces to the desired wave profile.

This gentle method for shaping flat materials into wave profiles is further developed according to the invention in that with limited cost the most varied profile heights and profile cross-sections can be rapidly and easily shaped in the wave profile of the completely shaped, wavy flat material.

For this purpose an essential concept of the invention proposes modifying in planned manner the centre distance between the rolls before or optionally even during the shaping process in such a way that the desired profile height is shaped in the wave profile. In this way the profile height of the wave profile or the material thickness of the finished composite material dependent on the profile height of the wavy flat material can be adapted in planned manner to the intended uses, without this requiring, as in the prior art, the replacement of rolls or shaping tools with correspondingly long tooling and non-production times.

In addition, the actual shaping process, which is normally a cold shaping or working process, i.e. a shaping process in which the temperature of the flat material to be shaped is within the recrystallization temperature, can be adapted in planned manner to the material characteristics of the flat material to be shaped, so that in the case of hard materials or materials with a comparatively great thickness a wave profile with smaller profile height can be shaped in order to keep low the degree of shaping, whereas soft or thin materials can be shaped with correspondingly higher degrees of shaping.

The invention also proposes by relative rotation of the rolls with respect to one another to adjust the flank clearance between the meshing tooth systems, so as in this way to additionally influence in planned manner the profile cross-section of the wave profile and to optimize the same with respect to the subsequent use intended for the wavy flat material or the composite material.

Further advantageous variants of the method according to the invention and further developments of the device according to the invention, as well as advantages of the invention can be gathered from the following description, drawings and sub-claims.

Thus, in a particularly preferred variant of the inventive method for shaping a metallic flat material, for producing a symmetrical or asymmetrical profile cross-section of the wave profile, it is proposed to rotate the rolls relative to one another. Whereas in one rotary position of the rolls with respect to one another, where the teeth of one roll are symmetrically positioned between the teeth of the other roll, a symmetrical wave profile in profile cross-section is shaped, by modifying the flank clearance between the tooth systems of the two rolls it is also possible to shape a wave profile, in which the position angles of the profile flanks of the wave profile differ from one another, i.e. an asymmetrical profile cross-section is shaped. This makes it possible to produce a wavy flat material in which a directionally oriented force introduction into the wavy flat material is possible, in that the individual profile flanks during the shaping of the wave profile are oriented in planned manner in the direction of the forces applied.

In a variant of this method according to the invention, it is proposed that the profile height of the wave profile be modified by continuously adjusting the rolls during shaping, so that the flat material is shaped as a function of the centre distance of the rolls on the one hand and as a function of the rotary position of the rolls with respect to one another on the other hand so as to give an optionally sinusoidal or asymmetrical wave profile.

For shaping a trapezoidal wave profile in profile cross-section, it is proposed that rolls be used which, in cross-section, have trapezoidal tooth systems. Whereas in the case of a large centre distance between the rolls a sinusoidal wave profile is shaped, for shaping a trapezoidal wave profile in profile cross-section the rolls are moved together to such an extent that the shaping gap between the tooth systems of the rolls at least approximately corresponds to the flat material thickness. In this case the flat material to be shaped adopts the trapezoidal shape of the tooth systems.

Alternatively or additionally thereto, it is proposed to so adjust the flank clearance between the leading or trailing tooth flanks of the mutually meshing tooth systems considered in the rotation direction in such a way that the flank clearance at least approximately corresponds to the flat material thickness. Thus, during the shaping process, the flat material is engaged by the mutually meshing tooth systems, which additionally aids the conveying movement of the flat material through the shaping gap formed between the tooth systems.

Particularly in the area where the flat material guided through the two rolls first comes into contact with one of the teeth of the tooth systems, relative movements occur between the moving teeth and the flat sides of the flat material to be shaped engaging thereon. So as to keep the resulting frictional forces as low as possible, in a particularly preferred variant of the inventive method for shaping the metallic flat material, it is also proposed to apply to the flat material and/or the rolls a lubricant with which the friction coefficient either at the surface of the flat material or at the surface of the tooth systems can be reduced to such an extent that the flat material can slide along on the teeth without any significant resistance during the shaping process.

As a lubricant, which is directly applied to the flat material, two types can be used. Firstly the use of a lubricant is proposed, which can be removed again from the flat material after shaping the wave profile, e.g. by evaporation. It is secondly possible to use a lubricant which still adheres to the flat material following the shaping thereof. Such an adhering lubricant should have a consistency which is preferably such that further working of the flat material with the adhering lubricant is possible, e.g. varnishing or bonding the wavy flat material, such as is e.g. frequently desired for the manufacture of composite materials.

The lubricant is preferably constituted by a lubricating varnish which is applied to the flat material prior to the shaping thereof and which is preferably free from grease and oil, so that the flat material can be varnished or adhesive can be applied to the wavy flat material. It has proved particularly advantageous to use a lubricating varnish based on an epoxy resin-binder. It is alternatively possible to use as a lubricant a galvanizing or zinc plating of the surface of the flat material to be shaped. Thus, when using steel sheets as the flat material for the shaping of wave profiles, the surfaces of the steel sheets are preferably galvanized or zinc plated, in order on the one hand to minimize frictional forces during shaping and on the other increase the corrosion resistance of the finished wave profile.

Additionally or as an alternative to the previously described lubricants, it is also possible to use a lubricating foil, which is applied to the flat material prior to the shaping thereof. The lubricating foil can be removed from the shaped flat material when said flat material has been shaped. The use of a lubricating foil has the advantage that it protects the surfaces of the flat material to be shaped from adhering impurities or surface unevennesses on the teeth of the tooth systems of the rolls, so that following shaping the wavy flat material surface has a uniform appearance.

According to another aspect of the invention a device is proposed, which is used for performing the previously described method for the continuous shaping of a metallic flat material to give a metallic wave profile.

In the case of this device according to the invention, both the centre distance between the rolls and the rotary position of the rolls with respect to one another can be adjusted, so that the height of the wave profile to be shaped on the one hand and the wave profile cross-section on the other can be easily modified by varying the centre distance or by adjusting the flank clearance.

In a preferred embodiment of the device according to the invention the centre distance between the rolls and/or the rotary position of the rolls with respect to one another can be continuously adjusted, so that it is possible to continuously set the most varied profile heights and the most varied profile cross-sections for the wave profile.

Particularly with very hard metallic materials, such as the previously described hard aluminum alloy, the problem arises that due to the hardness of the material the rolls only mounted at their ends sag in their central area, so that the wave profile may have a varying profile height considered over its width. To avoid this, particularly when shaping such materials having a comparatively great hardness, it is proposed that use be made of crowned or cambered rolls, which in their central roll sections, compared with the roll sections constructed directly at the bearing points, have a larger external diameter, so that when the rolls shape such hard materials they do not tend to sag in the central area. It is alternatively also possible in place of crowned rolls to provide additional support rolls, which are in engagement with the rolls used for shaping and support the rolls over their entire length, but do not come into contact with the flat material to be shaped.

In order that the flat material to be shaped can slide along the teeth of the rolls with minimum friction during shaping, it is proposed that the surfaces of the rolls, at least in the areas where they come into contact with the flat material, be constructed in such a way that they have a very low centerline average surface roughness Ra, preferably in a range 0.01 to 6.5 μm. For this purpose the rolls are ground and optionally even polished in the relevant areas. A coating can also be provided.

The profile height and profile cross-section of the wave profile to be shaped are also influenced by the tooth shape of the tooth systems of the rolls. In order to permit a sliding of the flat material on the teeth with even lower frictional losses, the crest of each tooth and/or the gullet formed between in each case two teeth is rounded off at the transitions or at its transition to the particular tooth flank. By rounding off the transitions it is ensured that the flat material can gently slide on the surfaces with its flat sides, so that it is in particular possible to effectively prevent a tearing of comparatively thin flat material.

So that if necessary trapezoidal wave profiles can be shaped on the flat material, the crest of each tooth and/or the gullet between two adjacent teeth is preferably flattened, so that each tooth has a trapezoidal cross-section. Through adjusting the centre distance between the rolls in such a way that the shaping gap between the tooth systems at least approximately corresponds to the flat material thickness, the flat material can be shaped in the indicated trapezoidal shape.

Particularly with this design of the teeth, it is particularly advantageous if the transitions between the tooth crest and the tooth flanks are rounded, because in this way during the shaping of the trapezium on the head thereof, i.e. the upper portion of the wave profile, there is a comparatively low stretching and a comparatively low notch effect.

It is also proposed that at least zonally each tooth flank is given a linear configuration in cross-section between the tooth crest and tooth gullet. Optionally, in cross-section, the tooth flank can even have a slightly curved, convex shape. As a result, during shaping the flat material to be shaped only comes into contact with the crests of the teeth, so that the friction between the flat material and the tooth systems is reduced and in this way a particularly gentle shaping process for shaping the wave profile is possible.

So that it is possible to set a very uniform profile height over the entire width of the wave profile, it is also advantageous if at the ends of the two rolls is in each case provided an adjusting device common to both rolls for adjusting the centre distance between said rolls, the two adjusting devices being adjustable separately from one another.

Another aspect of the invention relates to a method for the continuous manufacture of a composite material. In this inventive method, initially a wave profile is shaped on a metallic flat material in accordance with the previously described method and by adjusting the centre distance between the rolls it is possible to influence the profile height and, by adjusting the rotation positions of the rolls with respect to one another, the profile cross-section of the wave profile. Following the shaping of the wave profile, on the profile elevations of the wave profile is applied on one or both sides at least one further flat material, which is subsequently firmly joined to the wavy flat material.

According to a preferred variant of this method for the continuous manufacture of a composite material, it is proposed that the further flat material is also continuously applied to the wavy flat material and fixed thereto, particularly by adhesion or bonding.

The composite material manufactured in this way has comparable mechanical characteristics such as stiffness, strength and compressive strength to solid materials, but compared with the latter the composite material has a much lower weight.

Composite materials manufactured according to the inventive method are e.g. suitable as wall, ceiling or floor panels. They can also be used as air conditioning elements and the areas separated from one another and formed by the wave profile can be used as ducts for a heat transporting medium. The considerable profile height attainable through the method according to the invention makes it possible to fix such panels and air conditioning elements using fixing elements such as rivets, screws etc. partly received in the cavities formed between the wavy flat material and the further flat material, without said fixing elements projecting from the exposed surface of the panel or air conditioning element formed by the wavy flat material.

For the continuous manufacture of such a composite material, according to a further aspect of the invention a plant is proposed, which is equipped with a device for continuously shaping a wave profile on a flat material to be given a wavy configuration. In addition, the plant is provided with at least one supply device for supplying a further flat material, which supplies the further flat material to the wavy flat material passing out of the continuous shaping device. With the aid of a downstream joining unit, the wavy flat material is then firmly joined to the further flat material supplied.

The joining unit is preferably a device for applying adhesive to the profile elevations of the wave profile of the wavy flat material together with a pressing device with which the supplied, further flat material can be pressed against the wavy flat material provided with the adhesive.

The invention is described in greater detail hereinafter relative to an embodiment and the attached drawings, wherein show:

FIG. 1 A diagrammatic side view of a plant for the continuous manufacture of a composite material.

Figure 2:
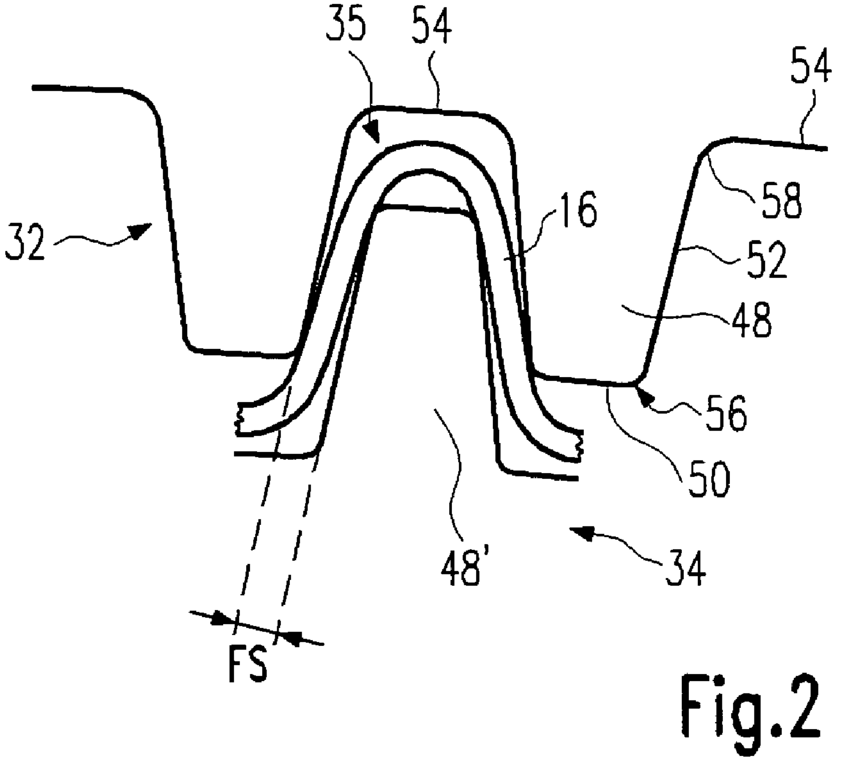

FIG. 2 A larger scale side view of a shaping gap between two rolls of a device, used in the plant according to FIG. 1, for shaping a flat material to a wave profile.

Figure 3:
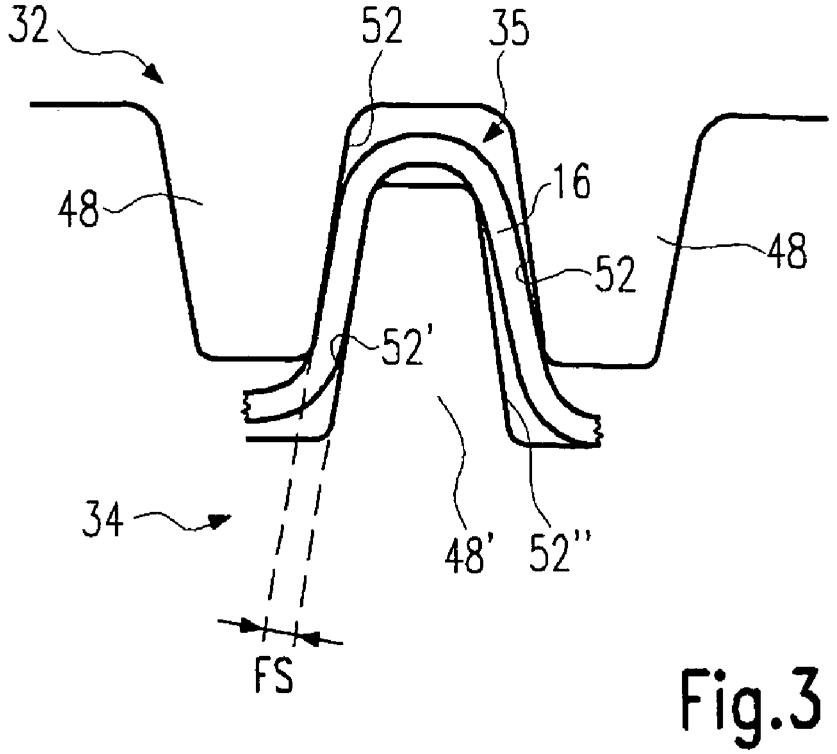

FIG. 3 The shaping gap of FIG. 2 with rolls shifted relative to one another.

FIG. 1 shows a plant 10 for the continuous manufacture of a composite material 12. The plant 10 has a device 14, which is used for continuously shaping a metallic flat material 16, e.g. a metal strip made from a hard aluminum alloy, so as to give a wave profile 18.

Adjacent to the device 14 is provided a first supply device 20 for a first, further flat material 22, which is optionally also made from a hard aluminum alloy, as well as a second supply device 24 for a second, further flat material 26 shown to the right in FIG. 1 and downstream when considered in the conveying direction of device 14.

The device 14 has two identically designed rolls 28 and 30, whose rotation axes are parallel to one another with a centre distance A. The circumferential surface of each roll 28 or 30 is in each case provided with a straight tooth system 32 or 34. The two tooth systems 32 and 34 of the two rolls 28 and 30 mesh with one another and form a shaping gap 35 (cf. FIGS. 2 and 3) through which is passed the flat material 16 for shaping the wave profile 18 and as will be described in detail hereinafter.

Immediately adjacent to the roll 30 shown at the bottom in FIG. 1 is positioned a first adhesive or bonding device 36 for applying adhesive to the profile elevations of wave profile 18. The adhesive device 36 is positioned adjacent to roll 30 in such a way that the wave profile 18 obtained on roll 30 following shaping can be coated with adhesive by the adhesive device 36.

Following the first bonding device 36 when considered in the rotation direction of roll 30, a rocker 38 fixed directly adjacent to roll 30 deflects to the latter the first, further flat material 22 supplied from the first supply device 20 of device 14. The first, further flat material 22 deflected by rocker 38 in the direction of roll 30 is pressed with the aid of a first pressing roll 40 against the side of the wave profile 18 to which adhesive has been previously applied by the bonding device 36.

With the aid of a not shown separating device following the pressing roll 40, the wave profile 18 bonded to the first, further flat material 22 is detached from the roll 30 and is guided along a support 42 through a second bonding or adhesive device 44, with which further device is applied further adhesive to the side of the wave profile 18 remote from the first, further flat material 22. Immediately following the second adhesive device 44 is provided a second pressing roll 46, which presses the second, further flat material 26 supplied by the second supply device 24 onto the side of the wave profile 18, to which adhesive has been applied beforehand by the second bonding device 44. Following the hardening of the adhesive, the composite material 12 formed from the wavy flat material 16 and the two further flat materials 22 and 26 is cut to the desired lengths by a not shown cutting-to-length device.

As is indicated by the arrows in FIG. 1, the centre distance A between the two rolls 28 and 30 can be adjusted. The roll 28 shown at the top in FIG. 1 can have its rotary position relative to roll 30 adjusted, so that the flank clearance FS (cf.

FIGS. 2 and 3) between the tooth systems 32 and 34 can be adjusted, as will be explained hereinafter relative to FIGS. 2 and 3.

FIGS. 2 and 3 show on a larger scale the two mutually meshing tooth systems 32, 34 of the two rolls 28, 30. Each tooth system 32 or 34 is formed from a plurality of teeth 48 uniformly distributed over the circumference and which extend over the entire length of the roll 28 or 30.

As can be gathered from FIGS. 2 and 3, each tooth 48 has a flattened crest 50, which passes into a linearly directed tooth flank 52, which terminates in the tooth gullet 54 between two juxtaposed teeth 48. The two transitions 56 of the crest 50 of each tooth 48 in to the tooth flanks 52 of tooth 48 are rounded off. In the same way the transition 58 of each tooth flank 52 into the particular tooth gullet 54 is also rounded off.

As a result of the linear design of the tooth flanks 52, flat material 16 passed through between the tooth systems 32 and 34 as far as possible only comes into contact with the tooth crests 50 of tooth systems 32, 34, so that friction between flat material 16 and teeth 48 is minimized. In addition, the rounded transitions 56 and 58 aid a sliding along of the flat material 16 to be shaped on the surfaces of teeth 48, so that material fracture can be prevented, particularly in the case of very hard materials.

In order to additionally facilitate the sliding of the flat material 16 between tooth systems 32 and 34, at least those areas coming into contact with the flat material 16 to be shaped are ground or optionally even polished, so that the centerline average surface roughness Ra is in the range 0.01 to 0.6 μm.

To additionally reduce friction between tooth systems 32, 34 and flat material 16, the latter is coated with an epoxy resin-binder-based lubricant. The lubricant is formed in such a way that the adhesive to be applied following the shaping of the flat material 16 adheres and hardens in optimum manner on the surface of said flat material 16.

If the flat material 16 is now passed between the tooth systems 32 and 34, as shown on a larger scale in FIG. 2, as a result of the shaping gap 35 continuously narrowing during the rotation of the rolls 28, 30, a shaping takes place of the flat material 16 heated beforehand in a not shown heating device and the two tooth systems 32, 34 as a function of the previously set centre distance A between rolls 28, 30, shape the flat material 16 in a clearly defined form.

If e.g. a very large centre distance A is set between rolls 28 and 30, where the tooth systems 32, 34 only mesh slightly with one another, the flat material 16 is only slightly shaped and gains a flattened, sinusoidal wave profile 18. However, if the rolls 28, 30 are moved towards one another to such an extent that the shaping gap between the two tooth systems 32, 34 at least approximately corresponds to the thickness of flat material 16, a wave profile 18 is shaped, whose shape at least approximately corresponds to that of the individual teeth 48 of tooth systems 32, 34. As a result of the trapezoidal design of the tooth 48 in FIGS. 2 and 3 a trapezoidal wave profile 18 would be obtained. Alternatively in tooth cross-section, the teeth 48 can e.g. also have an involute shape, a cycloid shape, etc.

Symmetrical wave profiles 18 in particular arise if the flank clearance FS between the leading tooth flanks 52 considered in the rotation direction of rolls 28, 30 and the following tooth flanks 52 of the mutually meshing tooth systems 32, 34 is identical, i.e. each tooth 48 of one tooth system 32 is positioned centrally between the two teeth 48' meshing therewith of the other tooth system 34.

Through a corresponding adjustment of the rotary position of the upper roll 28 with respect to the lower roll 30, it is possible to modify the flank clearance FS in such a way that the two tooth systems 32, 34 are slightly displaced with respect to one another in the rotation direction of rolls 28, 30, so that the individual teeth 48, 48' of tooth systems 32, 34 are no longer positioned symmetrically to one another, as shown in FIG. 3. In this way it is possible to influence the friction ratios within the shaping gap 35 in such a way that, considered in profile cross-section, an asymmetrical wave profile 18 is shaped.

Thus, e.g. in FIG. 3, the flank clearance FS between the front tooth flank 52' of the lower tooth 48' and the rear tooth flank 52 of the leading, upper tooth 48 is reduced, whereas the distance between the rear tooth flank 52" of the lower tooth 48' with respect to the leading tooth flank 52 of the following tooth 48 of the upper tooth system 32 is increased.

In the case shown in FIG. 3, the reduced flank clearance FS is decreased to such an extent that it corresponds at least approximately to the thickness of the flat material 16 to be shaped. As a result, on the one hand the flat material 16 is deformed more in this area than in the area of the flat material 16 located in the region with the larger flank clearance. Simultaneously the frictional force between the flat material 16 and the sections of the tooth systems 32, 34 engaging thereon is increased in such a way that the flat material 16 is additionally conveyed by the two rolls 28, 30 due to the increased frictional forces.

If it is now necessary to shape a different wave profile 18, it is possible at any time to actively adjust during shaping the centre distance A between the rolls 28, 30 and optionally it is simultaneously possible to adjust the rotary position of roll 28 relative to roll 30. In this way in the case of the plant 10 according to the invention there is no need for the retooling of the latter, as is necessary in the prior art, in order to shape different wave profiles.

In the embodiment shown in FIG. 1, on both sides of the shaped wave profile 18 a flat material 22, 26 is provided, which gives rise to a so-called sandwich plate as the composite material 12, in which the wavy flat material 16 is located between the two flat materials 22, 26. By deactivating the second bonding device 44 and the second supply device 24, it is also possible to manufacture a composite material 12 in which a further flat material 22 is only provided on one side of the wavy flat material 16. If desired, it is also possible to shape only a single wavy flat material 16, without additional flat materials being bonded to the wavy flat material 16.

The invention claimed is:

1. A continuous method for shaping a metallic flat material to give a metallic wave profile, comprising:

passing through said flat material between two meshing tooth systems of two rotating, toothed rolls, said rolls being provided with a continuously adjustable center distance between each other, and with a continuously adjustable mutual rotation position, adjusting said center distance before or during said passing through of said flat material for setting a desired profile height of said wave profile, and adjusting a flank clearance between said meshing tooth systems before or during said passing through of said flat material by relative rotation with respect to one another of said rolls for presetting a profile cross-section of said wave profile, wherein said flank clearance between said meshing tooth systems is adjusted in such a way, that a clearance between leading tooth flanks of a first tooth system of said two tooth systems and following tooth flanks of a second tooth system of said two tooth systems at least approximately corresponds to a thickness of said flat material.

2. The method of claim 1, wherein said metallic flat material comprises a metal plate, a metal sheet, a metal strip or a combination of these.

3. The method of claim 1, wherein said profile cross-section of said wave profile is symmetrical.

4. The method of claim 1, wherein said profile cross-section of said wave profile is asymmetrical.

5. The method of claim 1, wherein said profile cross-section of said wave profile is sinusoidal.

6. The method of claim 1, wherein said profile cross-section of said wave profile is trapezoidal.

7. The method of claim 1, further comprising:

providing said tooth systems of said rolls with a trapezoidal cross-section, and bringing together said rolls until a shaping gap between said tooth systems of said rolls at least approximately corresponds to a thickness of said flat material, so that said profile cross-section of said wave profile is trapezoidal.

8. The method of claim 7, further comprising;

increasing said center distance of said rolls having said tooth systems provided with said trapezoidal cross-section, so that said profile cross-section of said wave profile is sinusoidal.

9. The method of claim 1, wherein, for providing said wave profile with an asymmetrical profile cross-section, said flank clearance between said meshing tooth systems is adjusted in such a way, that said tooth systems are displaced with respect to one another when considered in a rotation direction of said rolls, so that individual teeth of said tooth systems are positioned asymmetrically to one another.

10. The method of claim 1, further comprising the step of applying a lubricant to said flat material, to said rolls or to both said flat material and said rolls.

11. The method of claim 10, wherein said lubricant is applied to said flat material prior to said passing through of said flat material between said two meshing tooth systems.

12. The method of claim 11, wherein said lubricant is a lubricating varnish.

13. The method of claim 12, wherein said lubricating varnish is epoxy resin-binder based.

14. The method of claim 11, wherein said lubricant is a lubricating foil.

15. The method of claim 14, further comprising the step of removing said lubricating foil from said flat material following said passing through of said flat material between said two meshing tooth systems.

16. A method for the continuous manufacture of a composite material, comprising:

shaping, in accordance with the method of claim 1, a wave profile having profile elevations on a metallic flat material to give a wavy flat material, applying a second flat material to said profile elevations of said wavy flat material on a first side of said wavy flat material, and firmly joining said second flat material to said wavy flat material.

17. The method of claim 16, further comprising:

applying a third flat material to said profile elevations of said wavy flat material on a second side of said wavy flat material, and firmly joining said third flat material to said wavy flat material.

18. The method of claim 16, wherein said metallic flat material comprises a metal plate, a metal sheet, a metal strip or a combination of these.

19. The method of claim 16, wherein said second flat material is continuously applied to said wavy flat material and joined thereto.

20. The method of claim 16, wherein said second flat material is adhered to said wavy flat material.

21. The method of claim 17, wherein said third flat material is continuously applied to said wavy flat material and joined thereto.

22. The method of claim 17, wherein said third flat material is adhered to said wavy flat material.

23. Device for continuous shaping of a metallic flat material to give a metallic wave profile, comprising:

two rotary, toothed rolls provided with meshing tooth systems, said meshing tooth systems being provided for passing through said flat material to be shaped between, means for continuously adjusting a center distance between said rolls for setting a profile height of said wave profile, and means for adjusting a flank clearance between said meshing tooth systems by continuously adjusting a mutual rotation position of said rolls for modifying a profile cross-section of said wave profile, wherein said flank clearance between said meshing tooth systems is adjusted in such a way, that a clearance between leading tooth flanks of a first tooth system of said two tooth systems and following tooth flanks of a second tooth system of said two tooth systems at least approximately corresponds to a thickness of said flat material.

24. The device of claim 23, wherein said metallic flat material comprises a metal plate, a metal sheet, a metal strip or a combination of these.

25. The device of claim 23, wherein said rotary, toothed rolls are crowned.

26. The device of claim 23, wherein surfaces of said rotary, toothed rolls have a centerline average surface roughness in a range of 0.01 μm to 6.5 μm.

27. The device of claim 26, wherein said surfaces of said rotary, toothed rolls are ground.

28. The device of claim 26, wherein said surfaces of said rotary, toothed rolls are coated.

29. The device of claim 26, wherein said surfaces of said rotary, toothed rolls are polished.

30. The device of claim 26, wherein said surfaces are provided in areas where said rolls come into contact with said flat material.

31. The device of claim 23, wherein said tooth systems are provided with teeth each having a crest and tooth flanks, and said crests are rounded at transitions leading into said tooth flanks.

32. The device of claim 23, wherein said tooth systems are provided with teeth having tooth flanks, and with gullets located between adjacent teeth, said gullets are provided with transitions leading into adjacent tooth flanks, and said transitions of said gullets are rounded.

33. The device of claim 23, wherein said tooth systems are provided with teeth each having a crest, and said crests of said teeth are flattened.

34. The device of claim 23, wherein said tooth systems are provided with teeth and with gullets located between adjacent teeth, and said gullets are flattened.

35. The device of claim 23, wherein said tooth systems are provided with teeth each having a crest, with gullets located between said teeth, and with tooth flanks extending between said crests and said gullets, and wherein each of said tooth flanks has a zone having a linear cross-section.

36. The device of claim 23, wherein said tooth systems are provided with teeth each having a crest, with gullets located between said teeth, and with tooth flanks extending between said crests and said gullets, and wherein each of said tooth flanks has a zone having a slightly curved, convex shape.

37. The device of claim 23, wherein said rolls are each provided with two ends, at each of said ends are provided adjusting means common to both rolls for adjusting said center distance between said rolls, and said two adjusting means are adjustable separately from one another.

38. A plant for continuous manufacture of a composite material comprising a wavy flat material and at least one further flat material, the plant comprising:

the device of claim 23 for the continuous shaping of a metallic flat material to give a wavy flat material having a wave profile, at least one supply device for supplying said further flat material to said wavy flat material passing out of said device of claim 23, and at least one joining unit for joining said wavy flat material to said further flat material.

39. The plant of claim 38, wherein said wavy flat material comprises a wavy metal plate, a wavy metal sheet, a wavy metal strip or a combination of these.

40. The plant of claim 38, wherein said joining unit is provided with means for applying adhesive to profile elevations provided in said wave profile of said wavy flat material, and wherein said joining unit is further provided with a pressing device for pressing said further flat material against said wavy flat material provided with said adhesive.

41. The plant of claim 40, wherein said pressing device comprises a pressing roll.

* * * * *